United States Patent
Lin et al.

(10) Patent No.: US 9,516,645 B2
(45) Date of Patent: Dec. 6, 2016

(54) CARRIER AGGREGATION IN A COMMUNICATION SYSTEM

(75) Inventors: Jie Zhen Lin, Beijing (CN); Jian Feng Qiang, Beijing (CN); Yong Teng, Beijing (CN); Chunli Wu, Beijing (CN)

(73) Assignee: Nokia Solutions and Networks Oy, Espoo (FI)

( * ) Notice: Subject to any disclaimer, the term of this patent is extended or adjusted under 35 U.S.C. 154(b) by 36 days.

(21) Appl. No.: 14/003,848

(22) PCT Filed: Mar. 25, 2011

(86) PCT No.: PCT/CN2011/072185
§ 371 (c)(1),
(2), (4) Date: Sep. 9, 2013

(87) PCT Pub. No.: WO2012/129764
PCT Pub. Date: Oct. 4, 2012

(65) Prior Publication Data
US 2013/0343324 A1    Dec. 26, 2013

(51) Int. Cl.
*H04W 4/00*      (2009.01)
*H04W 72/04*     (2009.01)
(Continued)

(52) U.S. Cl.
CPC .......... *H04W 72/0453* (2013.01); *H04L 5/001* (2013.01); *H04L 5/0098* (2013.01); *H04L 27/0006* (2013.01)

(58) Field of Classification Search
CPC ...... H04L 5/00; H04L 5/0098; H04L 27/0006; H04W 72/0453
(Continued)

(56) References Cited

U.S. PATENT DOCUMENTS

2004/0203815 A1    10/2004  Shoemake et al.
2012/0142361 A1*    6/2012  Zhao et al. .................. 455/446
2013/0010720 A1*    1/2013  Lohr et al. .................... 370/329

FOREIGN PATENT DOCUMENTS

CN              101867454 A       10/2010
WO     WO 2010/027186 A2          3/2010
(Continued)

OTHER PUBLICATIONS

3GPP TS 36.331 V10.1.0 (Mar. 2011), "$3^{rd}$ Generation Partnership Project; Technical Specification Group Radio Access Network; Evolved Universal Terrestrial Radio Access (E0UTRA); Radio Resource Control (RRC); Protocol specification (Release 10)", 290 pgs.
(Continued)

*Primary Examiner* — Mang Yeung
(74) *Attorney, Agent, or Firm* — Harrington & Smith

(57) ABSTRACT

The disclosure relates to use of carriers for aggregation in a wireless system. A set of carriers available for use in carrier aggregation is first determined. It is then determined if at least one carrier of the set of carriers can become unavailable for use by a communication device. An indication of a configuration type of the at least one carrier is sent to the communication device, the configuration type being indicative of different behavior during a period. The at least one carrier is maintained in the set of carriers during said period. The communication device receives the indication. If a change in the availability state of the at least one carrier is determined, the communication is operated, device in relation to the at least one carrier, according to the availability state and the received indication during said period.

15 Claims, 7 Drawing Sheets

(51) Int. Cl.
*H04L 5/00* (2006.01)
*H04L 27/00* (2006.01)

(58) Field of Classification Search
USPC ......... 370/329, 341, 431, 437; 455/450–464, 455/509, 524, 525
See application file for complete search history.

(56) References Cited

FOREIGN PATENT DOCUMENTS

WO  WO 2010/143924 A2  12/2010
WO  WO 2011032497 A1 *  3/2011

OTHER PUBLICATIONS

Ericsson et al: "Methods for WLAN/Bluetooth in-device coexistence interference avoidance"; 3GPP Draft; R2-103900; 3rd Generation Partnership Project (3GPP); Mobile Competence Centre; 650, Route des Lucioles; F-06921 Sophia-Antipolis Cedex; France; vol. RAN WG2; No. Stockholm, Sweden; Jun. 28, 2010; Jun. 22, 2010; XP050451285; [retrieved on Jun. 22, 2010]; Section 2.

Lu Zhang et al: "Cognitive Interference Management for LTE-A Femtocells with Distributed Carrier Selection"; Vehicular Technology Conference Fall (VTC 2010-Fall); 2010 IEEE 72nd; IEEE; Piscataway, NJ, USA; Sep. 6, 2010; pp. 1-5, XP031770532; ISBN: 978-1-4244-3573-9; Section III.

IEEE Std 802.22.1-2010; "IEEE Standard for Information Technology—Telecommunications and information exchange between systems Local and metropolitan area networks—Specific requirements—Part 22.1: Standard to Enhance Harmful Interference Protection for Low-Power Licensed Devices Operating in TV Broadcast Bands"; pp. 1-145; IEEE Computer Society; Sponsored by the LAN/MAN Standards Committee; Nov. 1, 2010; IEEE; 3 Park Avenue; New York; NY 10016-5997; USA.

IEEE Std 802.11, 1999 Edition (R2003) "Information technology—Telecommunications and information exchange between systems—Local and metropolitan area networks—Specific requirements—Part 11: Wireless LAN Medium Access Control (MAC) and Physical Layer (PHY) Specifications"; pp. 1-528; Sponsor LAN MAN Standards Committee of the IEEE Computer Society; Reaffirmed Jun. 12, 2003; IEEE-SA Standards Board; IEEE; 3 Park Avenue; New York; NY 10016-5997; USA.

* cited by examiner

CARRIER AGGREGATION IN A COMMUNICATION SYSTEM

The invention relates to carrier aggregation, and more particularly to support of carriers for carrier aggregation in a communication system where carriers can have different usage availability.

A communication system can be seen as a facility that enables communication between two or more communication devices such as user terminals, base stations and/or other nodes by providing carriers between the communication devices. A communication system can be provided for example by means of a communication network and one or more compatible communication devices. The communication may comprise, for example, communication of data for carrying communications such as voice, electronic mail (email), text message, multimedia and/or content data and so on. Non-limiting examples of services provided include two-way or multi-way calls, data communication or multimedia services and access to a data network system, such as the Internet.

In a wireless communication system at least a part of communications between at least two stations occurs over wireless interfaces. Examples of wireless systems include public land mobile networks (PLMN), satellite based communication systems and different wireless local networks, for example wireless local area networks (WLAN). The wireless systems can typically be divided into cells, and are therefore often referred to as cellular systems. International Telecommunication Union (ITU) has defined standards and specifications for International Mobile Telecommunications (IMT) for data transmission by mobile devices. The carriers or bands defined by the ITU are often referred to as IMT bands. This term can be understood as referring to bands provided by base stations of cellular systems, for example those based on second generation (2G), third generation (3G) and fourth generation (4G) technologies.

A user can access a communication system by means of an appropriate communication device or terminal. A communication device of a user is often referred to as user equipment (UE). A communication device is provided with an appropriate signal receiving and transmitting apparatus for enabling communications, for example enabling access to a communication network or communications directly with other users. The communication device may access a carrier provided by a station, for example a base station of a cell, and transmit and/or receive communications on the carrier.

Carrier aggregation can be used to increase performance. In carrier aggregation a plurality of carriers are aggregated to increase bandwidth. Carrier aggregation comprises aggregating a plurality of component carriers into a carrier that is referred to in this specification as an aggregated carrier.

A communication system and associated devices typically operate in accordance with a given standard or specification which sets out what the various entities associated with the system are permitted to do and how that should be achieved. For example, it can be defined if carrier aggregation is used. Communication protocols and/or parameters which shall be used for the connection are also typically defined. An example of the standardized architectures is known as the long-term evolution (LTE) of the Universal Mobile Telecommunications System (UMTS) radio-access technology. The LTE is being standardized by the 3rd Generation Partnership Project (3GPP). The various development stages of the 3GPP LTE specifications are referred to as releases. A development of the LTE is often referred to as LTE-Advanced (LTE-A). A feature of LTE-Advanced is that it is capable of providing carrier aggregation. In LTE-A two or more component carriers (CCs) can be aggregated in order to support wider transmission bandwidths and/or for spectrum aggregation.

It is possible to configure a user equipment (UE) to aggregate a different number of component carriers originating from the same base station, and of possibly different bandwidths in the uplink (UL) and the downlink (DL) component carrier sets. It is also possible to configure a user equipment to support component carriers by different base stations and cells to provide an aggregate carrier.

The concept of a primary component carrier has also been proposed. The primary component carrier would be provided by a primary cell where the user equipment performs radio resource control (RRC) connection establishment, and can thus be foreseen as the cell governing the link. A base station (BS) can utilize an IMT band as a primary carrier where the base station can provide stable access for a user equipment (UE). Secondary carriers can be added to the primary carrier from other IMT bands in accordance with the current carrier aggregation (CA) schemes. 3GPP has defined user equipment (UE) specific primary cells (PCell) and secondary cells (SCells). A PCell can only be changed with handover procedure. Re-establishment can be triggered when PCell experiences a radio link failure (RLF), but not for example when SCells experience RLF.

Possibility of using non-IMT bands in carrier aggregation has been proposed. For example, non-IMT carriers may be added by means of cognitive radio (CR) capabilities of the base station to provide additional capacity. The non-IMT bands may comprise less stable and fast varying carriers. For example, non-IMT carriers may include bands intended for another service. It is also possible to access non-IMT bands with CR capability to allow secondary usage or unlicensed usage of the IMT service. For example, non-licensed access of e.g. industrial, scientific and medical (ISM) radio bands, and so on may be allowed.

The secondary carriers can be selected for example on the basis of interference status and/or other criteria on usability. The serving carrier selection can be provided by a base station and/or assisted by a control apparatus of a network. For example, a database for providing information on usability of non-IMT bands on a particular area and/or particular duration may be provided in a network. This procedure can be transparent to the user equipment. After evaluating suitability, a base station apparatus may generate and maintain a set of candidate carriers. For example, a list of suitable carriers and/or cells can be provided.

A user equipment needs to be appropriately configured for it to be capable of using the primary and secondary carriers. The configuration of secondary carriers may be problematic, in particular if they are non-IMT carriers. Delays in configuring for varying secondary carriers should be kept as small as possible. Also, an incumbent service may need to be protected. In certain applications the quality of service (QoS) of an IMT service on handover may need to be ensured. In some instances varying secondary carriers may cause unnecessary power consumption at the user equipment.

It is noted that the above discussed issues are not limited to any particular communication environment, but may occur in any appropriate communication system where carrier aggregation may be provided.

Embodiments of the invention aim to address one or several of the above issues.

In accordance with an embodiment there is provided a method for controlling use of carriers for aggregation in a wireless communication system, comprising determining a set of carriers available for use in carrier aggregation; determining at least one carrier of the set of carriers that can become unavailable for use by a communication device; sending to the communication device an indication of a configuration type of the at least one carrier, the configuration type being indicative of different behavior during a period; and maintaining the at least one carrier in the set of carriers during said period.

In accordance with another embodiment there is provided a method for wireless communications on aggregated carriers by a communication device, comprising receiving an indication of a configuration type of at least one carrier of a set of carriers available for use in carrier aggregation, the configuration type being indicative of different behavior during a period;

determining a change in the availability state of the at least one carrier; and operating the communication device in relation to the at least one carrier according to the availability state and the received indication during said period.

In accordance with another embodiment there is provided an apparatus for controlling use of carriers for aggregation in a wireless communication system, the apparatus comprising at least one processor, and at least one memory including computer program code, wherein the at least one memory and the computer program code are configured, with the at least one processor, to determine a set of carriers available for use in carrier aggregation; determine at least one carrier of the set of carriers that can become unavailable for use by a communication device; cause sending to the communication device an indication of a configuration type of the at least one carrier, the configuration type being indicative of different behavior during a period; and maintain the at least one carrier in the set of carriers during said period.

In accordance with yet another embodiment there is provided an apparatus for controlling wireless communications on aggregated carriers by a communication device, the apparatus comprising at least one processor, and at least one memory including computer program code, wherein the at least one memory and the computer program code are configured, with the at least one processor, to receive an indication of a configuration type of at least one carrier of a set of carriers available for use in carrier aggregation, the configuration type being indicative of different behavior during a period; determine a change in the availability state of the at least one carrier; and cause operation of the communication device in relation to the at least one carrier according to the availability state and the received indication during said period.

In accordance with a more specific embodiment the period comprises a period of unavailability of the at least one carrier for the communication device and/or a duration of an activation or deactivation procedure of the at least one carrier.

A change in the availability state of the at least one carrier can be determined upon receiving instructions for activation or deactivation of the at least one carrier.

The configuration type may be indicated in relation to a secondary cell. Alternatively, or in addition, the configuration type may be indicated in relation to a non-IMT band.

Carrier aggregation may be provided by means of at least one carrier provided by a primary cell and at least one carrier provided by a secondary cell, wherein the at least one carrier provided by the secondary cell varies more than the at least one carrier provided by the primary cell.

The at least one carrier may be used based on cognitive radio.

The communication device may refrain from measurement operations on the at least one carrier during said period. The measurement operations may comprise at least one of measuring and reporting measurement results.

Scheduling of resources may be ceased on the at least one carrier during said period.

Switching to operation in accordance with the indication of the configuration type mat occur upon reception of a deactivation command. Synchronization with a secondary cell providing the at least one carrier may be provided upon reception of an activation command.

Determining of the at least one carrier may comprise determining usability of the carrier.

A device and/or access node comprising an apparatus configured to provide at least one of the embodiments can also be provided. The device may comprise a communication device such as a user equipment or another node capable of wireless communication. The access nodes may comprise a base station, a device-to-device node or a relay node.

A computer program comprising program code means adapted to perform the herein described methods may also be provided. In accordance with further embodiments apparatus and/or computer program product that can be embodied on a computer readable medium for providing at least one of the above methods is provided.

Various other aspects and further embodiments are also described in the following detailed description of examples embodying the invention and in the attached claims.

The invention will now be described in further detail, byway of example only, with reference to the following examples and accompanying drawings, in which.

Figure 1:
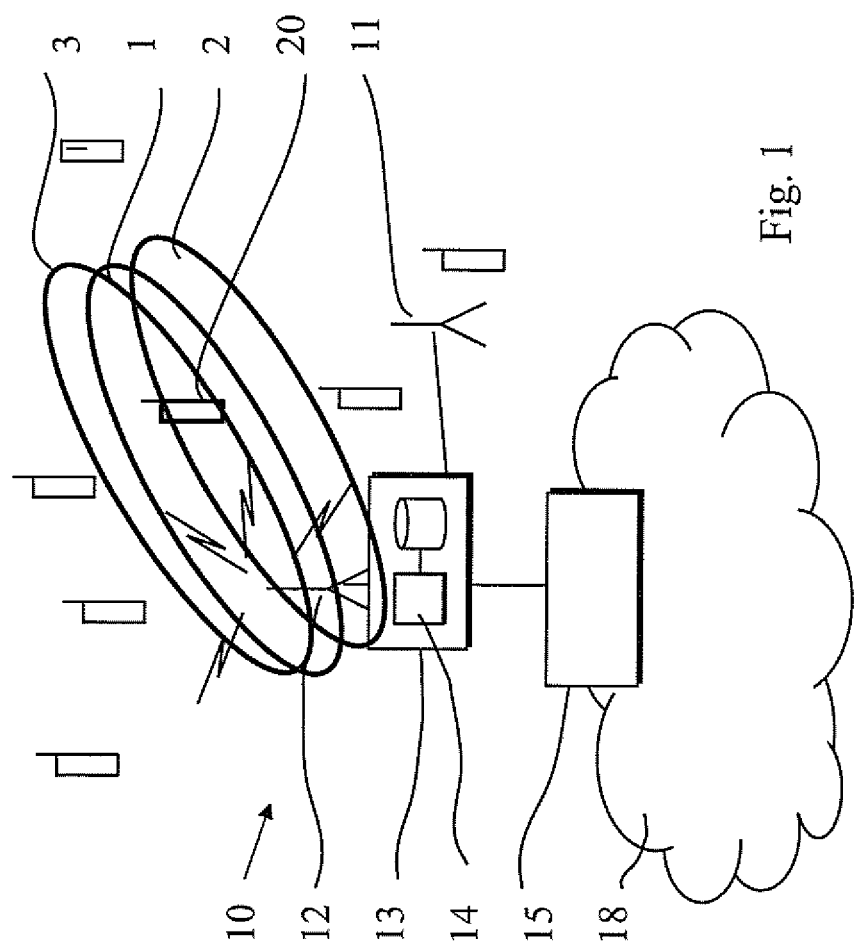
FIG. 1 shows an example of a system wherein below described examples of the invention may be implemented.

In the following certain exemplifying embodiments are explained with reference to a wireless communication system serving devices adapted for wireless communication. Therefore, before explaining in detail the exemplifying embodiments, certain general principles of a wireless system, components thereof, and devices for wireless communication are briefly explained with reference to system 10 of FIG. 1, device 20 of FIG. 2 and control apparatus 30 of FIG. 3 to assist in understanding the technology underlying the described examples.

A communication device can be used for accessing various services and/or applications provided via a communication system. In wireless or mobile communication systems the access is provided via a wireless access interface between mobile communication devices and an appropriate access system. A mobile device may access wirelessly a communication system via a base station. A base station site can provide one or more cells of a cellular system. A base station can provide, for example, three carriers, each carrier providing a cell. In the FIG. 1 example, a base station 12 is shown to provide three cells 1, 2 and 3. Each cell provides a carrier F1, F2 and F3, respectively. Each mobile device 20 and base station may have one or more radio channels open at the same time and may receive signals from more than one source.

Figure 4:
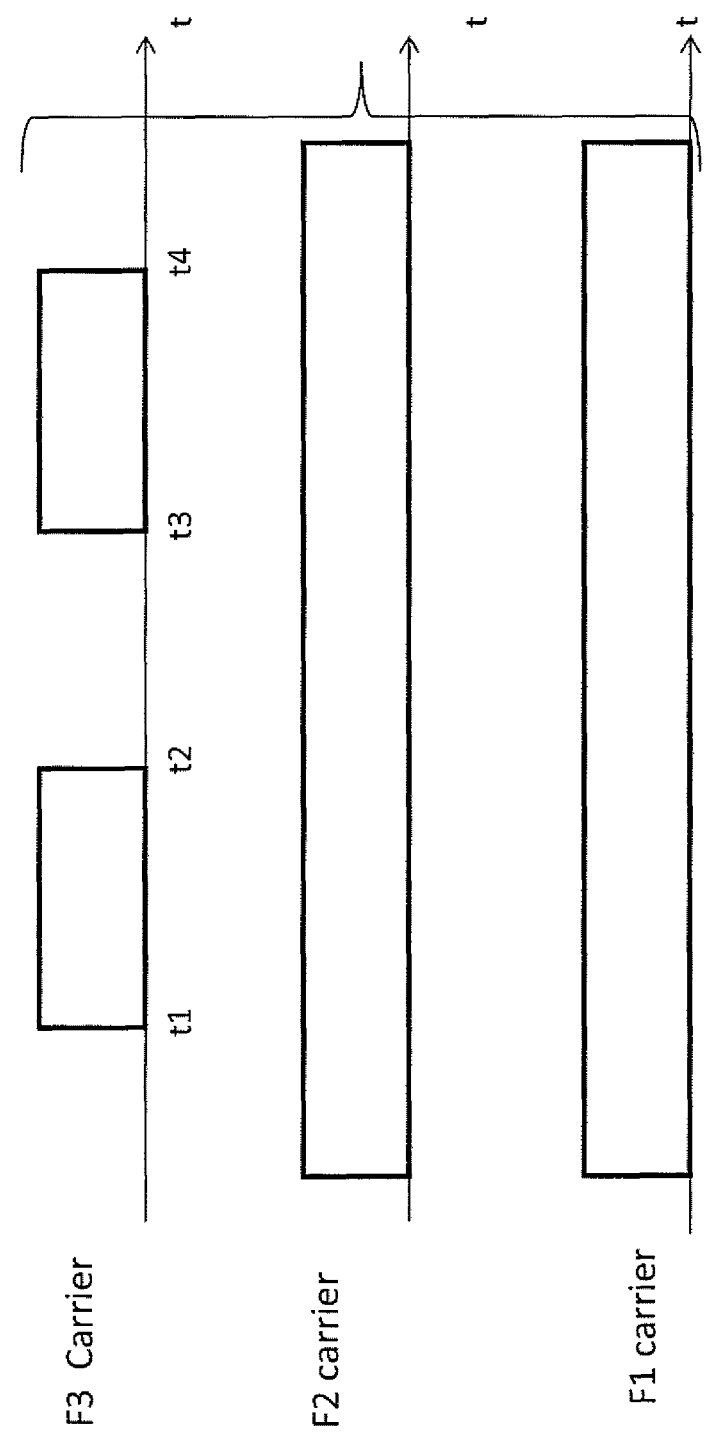
FIG. 4 is an example of carrier aggregation with non-IMT band.

It is noted that at least one of the cells 1 to 3 can be provided by means of remote radio heads of base station 12. Also, at least one of the carriers may be provided by a station that is not co-located at base station 12 but could only be controlled by the same control apparatus as the other cells. This possibility is denoted by station 11 in FIG. 1. For example, block 13 could be used to control at least one further station, for example an intra-eNB. Interaction between the different stations and/or controllers thereof may also be arranged otherwise, for example if a station is provided as an inter-site eNB. For the purposes of understanding this disclosure it is sufficient to assume that a controller of a cell has enough information for all of the aggregated carriers (cells). An example of an aggregated carrier comprising carriers F1 to F3 is shown in FIG. 4.

A base station is typically controlled by at least one appropriate controller so as to enable operation thereof and management of mobile communication devices in communication with the base station. The control entity can be interconnected with other control entities. In FIG. 1 the controller is shown to be provided by block 13. An appropriate controller apparatus may comprise at least one memory, at least one data processing unit and an input/output interface. The controller is thus typically provided with memory capacity and at least one data processor 14. It shall be understood that the control functions may be distributed between a plurality of controller units. The controller apparatus for a base station may be configured to execute an appropriate software code to provide the control functions as explained below in more detail.

In the FIG. 1 the base station node 12 is connected to a data network 18 via an appropriate gateway 15. A gateway function between the access system and another network such as a packet data network may be provided by means of any appropriate gateway node, for example a packet data gateway and/or an access gateway. A communication system may thus be provided by one or more interconnect networks and the elements thereof, and one or more gateway nodes may be provided for interconnecting various networks.

A communication device can access a communication system based on various access techniques, such as code division multiple access (CDMA), or wideband CDMA (WCDMA). The latter technique is used by communication systems based on the third Generation Partnership Project (3GPP) specifications. Other examples include time division multiple access (TDMA), frequency division multiple access (FDMA), space division multiple access (SDMA) and so on. A non-limiting example of mobile architectures where the herein described principles may be applied is known as the Evolved Universal Terrestrial Radio Access Network (E-UTRAN).

A non-limiting example of base station of a cellular system is what is termed as a NodeB or enhanced NodeB (eNB) in the vocabulary of the 3GPP specifications. The eNBs may provide E-UTRAN features such as user plane Radio Link Control/Medium Access Control/Physical layer protocol (RLC/MAC/PHY) and control plane Radio Resource Control (RRC) protocol terminations towards mobile communication devices.

Figure 2:
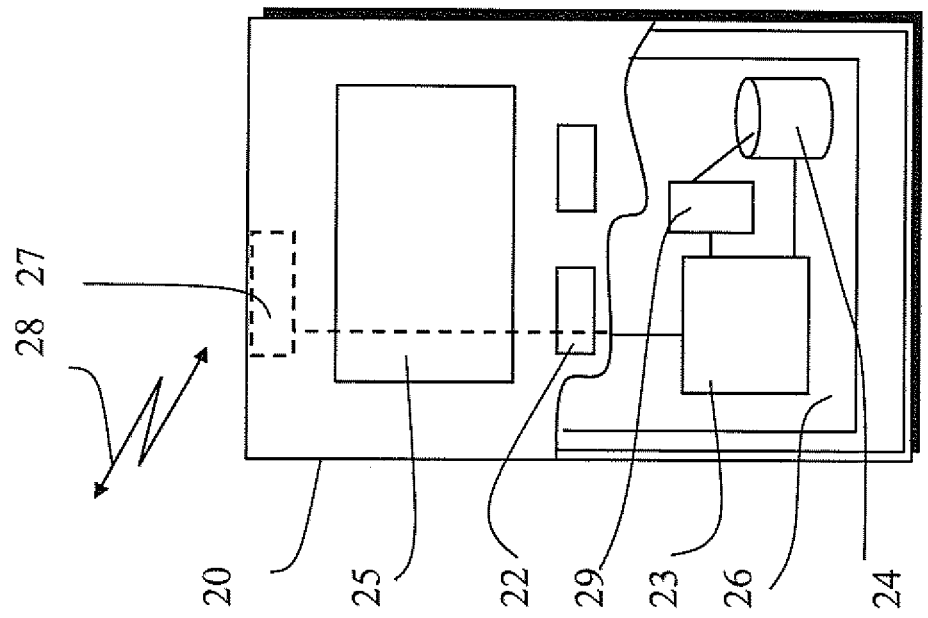
FIG. 2 shows an example of a communication device

FIG. 2 shows a schematic, partially sectioned view of a communication device 20 that a user can use for communications. Such a communication device is often referred to as user equipment (UE) or terminal. An appropriate mobile communication device may be provided by any device capable of sending and receiving radio signals. Non-limiting examples include a mobile station (MS) such as a mobile phone or what is known as a 'smart phone', a portable computer provided with a wireless interface card or other wireless interface facility, personal data assistant (PDA) provided with wireless communication capabilities, or any combinations of these or the like. A mobile communication device may provide, for example, communication of data for carrying communications such as voice, electronic mail (email), text message, multimedia, positioning data, other data, and so on. Users may thus be offered and provided numerous services via their communication devices. Non-limiting examples of these services include two-way or multi-way calls, data communication or multimedia services or simply an access to a data communications network system, such as the Internet.

A mobile device is typically provided with at least one data processing entity 23, at least one memory 24 and other possible components 29 for use in software and hardware aided execution of tasks it is designed to perform, including control of access to and communications with base stations and other communication devices. The data processing, storage and other relevant control apparatus can be provided on an appropriate circuit board and/or in chipsets. This feature is denoted by reference 26. Control and memory functions provided by the control apparatus of the mobile device in view of channel selection in accordance with certain embodiments of the present invention will be described later in this description.

The user may control the operation of the mobile device by means of a suitable user interface such as key pad 22, voice commands, touch sensitive screen or pad, combinations thereof or the like. A display 25, a speaker and a microphone are also typically provided. Furthermore, a mobile communication device may comprise appropriate connectors (either wired or wireless) to other devices and/or for connecting external accessories, for example hands-free equipment, thereto.

The device 20 may receive and transmit signals 28 via appropriate apparatus for receiving and transmitting signals. In FIG. 2 transceiver apparatus is designated schematically by block 27. The transceiver apparatus is provided with cognitive radio capability. The transceiver may be provided for example by means of a radio part and associated antenna arrangement. The antenna arrangement may be arranged internally or externally to the mobile device. A wireless communication device can be provided with a Multiple Input/Multiple Output (MIMO) antenna system.

An IMT type communication device can be configured for access to both IMT bands and non-IMT bands, for example via the IMT air interface in carriers F1, F2 and F3 of base station 12 of FIG. 1.

Figure 3:
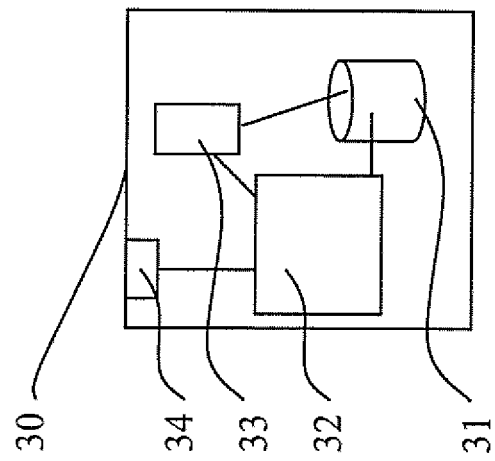
FIG. 3 shows an example of a control apparatus.

FIG. 3 shows an example of a control apparatus 30 for an access node, for example to be coupled to and/or for controlling a station of a radio service area, for example one of the nodes 11 or 12 of FIG. 1. The control apparatus 30 can be arranged to provide control on configurations, measurements, information processing and/or communication operations of an access node. A control apparatus in accordance with FIG. 3 can be configured to provide control functions in association with generation, communication and interpretation of information regarding carrier aggregation and/or other operations, such as determining cognitive radio capabilities. For providing the desired operation, the control apparatus 30 comprises at least one memory 31, at least one data processing unit 32, 33 and an input/output interface 34. Via the interface the control apparatus can be coupled to the relevant node. The control apparatus 30 can be configured to execute an appropriate software code to provide the control functions.

A principle of carrier aggregation and the characteristic of a non-IMT band carrier is illustrated in FIG. 4 showing use of three component carriers F1, F2 and F3 to form system bandwidth. E.g. 3GPP LTE-Advanced terminals adapted for operation in accordance with release 9 and upwards can receive or transmit simultaneously on multiple aggregated component carriers in the same transmission time interval (TTI). That is, two or more carriers (component carriers) can be aggregated such that a communication device may simultaneously communicate one or multiple component carriers depending on its capabilities.

The component carriers of an aggregated carrier can be provided by different cells. In FIG. 4 F1 carrier is provided on an IMT band as a primary carrier by a primary cell (P-cell). F2 carrier is provided by a band that permits secondary usage. This carrier can be stably occupied by an IMT base station. F3 carrier is a fast varied band of secondary usage or ISM band. This carrier cannot be stably occupied by an IMT base station.

Some of the carriers can be within IMT bands and some of them can belong to non-IMT bands. If a carrier is within the IMT bands, it will be fully available for the base station 12 to utilize. This is the case with carrier F1 in FIG. 4. If a carrier belongs to non-IMT bands, this carrier can be called as cognitive radio (CR) type carrier. The base station can operate on this band with cognitive radio capability and determine when the carrier is usable for IMT communications and when not. The base station may base its decisions e.g. on interference, for example such that unnecessary interference to an incumbent service in these bands is avoided. In some cases a carrier may be stably used for an IMT base station, this being shown by F2 carrier in FIG. 4.

In some scenarios a carrier may be of variant usability for an IMT base station. This is shown by F3 carrier in FIG. 4. As shown in FIG. 4, carrier F3 is only available on time durations from t1 to t2 and from t3 to t4, and so on. In other periods carrier F3 is not usable for the IMT base station. On the available duration, the base station may provide an IMT interface to the user equipment on this carrier as well and support carrier aggregation for non-IMT bands with other carriers.

Carrier F3 may not be originally allocated for an IMT service. However, with secondary usage or unlicensed usage the carrier can be provided by a base station via IMT interface on its permitted periods. As shown in FIG. 1, user equipments (UE) can be distributed within the coverage of a base station. Thus they may encounter different interference and other radio conditions on different carriers. For example, it is possible that a UE near to adjacent cell on frequency 1 (F1) can experience interference on F1 while another attached UE near to a neighbour cell on another frequency (F2) can suffer interference on F2 but can be comfortable in this regard on F1.

In accordance with an embodiment the current carrier aggregation (CA) scheme can be adapted to support use of one or more non-IMT carriers or bands in carrier aggregation. The non-IMT bands can be accessible by mobile devices with cognitive radio (CR) capability. The non-IMT carriers may include bands that allow secondary usage or industrial, scientific and medical (ISM) radio bands.

For the purposes of illustration, non-IMT bands can be roughly categorized in two types. A first type comprises bands with predictable variance on usability. The second type comprises bands with unpredictable variance on usability. For example, in the context of TV white space a TV broadcast service occupation is typically predictable while wireless microphone service occupation can be unpredictable. The band usability can also be partially predictable, at least on the predicted TV broadcast duration, such that the band is not available for cognitive radio usage. On other durations, the band usability is unpredictable, for example due to the wireless microphone service. In relation to the TV white space band it is noted that for a broadcasting service the variation in channel usability can be, for example, expressed in months, weeks, days or at least hours. For example, for wireless microphones the Federal Communications Commission (FCC), an independent agency of the United States government, has set the required Channel Move time in 2 seconds. A wireless microphone user would normally expect a microphone to be usable within about 2 seconds after it is switched on. If not, the user would be likely to conclude that it was not working properly. In-service sensing duration in accordance with IEEE (Institute of Electrical and Electronics Engineers) 802.22 protocol for TV white space is 5 ms every 160 ms for quick leaving in case of detecting an incumbent service. On an ISM band where all devices have equal access right, the band can be relatively unpredictable on usability.

A base station can timely utilize a predictable band when it is available and timely release a band when it is aware of incumbent service. By means of this the band can be efficiently utilized, and any potential interference to the provided service can be minimised, or at least mitigated in a controlled fashion. For unpredictable bands, a base station access can very opportunistic. The base station configurations to a communication device (such as any indications to a user equipment, directions to a user equipment for measurements, active/reactive commands, etc.) should be such that they are quickly effective.

It can be assumed that predictable bands may be easier for base station initiated configurations. Because of the predictable character, the configuration delay will not necessarily hamper timely utilization or release of this band. But even in predictable conditions, frequent variance on usability may still require relatively quick effective signalling procedures. The base station should able to adopt quick effective signalling procedure for carrier configuration. This may be particularly desirable in embodiments where secondary carriers are provided by non-IMT bands. In accordance with an embodiment signalling and procedure is introduces into 3GPP standards to support an additional non-IMT band on carrier aggregation. This may be provided specifically for an agile approach to activate/deactivate a special secondary cell which does not require measurement during a deactivation period. The scheme enables activation/deactivation of a configured secondary cell for a specific communication device depending on if a band is usable or unusable.

In accordance with the current 3GPP specifications a user equipment (UE) remains, after deactivation, in a state where it performs radio resource management (RRM) measurements on a deactivated secondary cell. The UE will also report the measurement results together with measurement results of other bands. The intention of remaining in the measurement and reporting state is that for the current secondary cell, although deactivated for a UE, it nevertheless can still be operating on the base station, and can potentially be activated at a later time.

However, for unusable bands accessed by means of cognitive radio (CR) capability, the situation can be different. The base station is not necessarily able to operate on this band and the user equipment would not need to measure it, e.g. during duration t2-t3 of FIG. 4. This is so since the Common Reference Symbol (CRS) for measurement does not exist as the base station does not transmit on this band. Measurements on this unusable band will unnecessarily consume power at the user equipment since this measurement is on a non-IMT band provided on an additional radio frequency. Since the band is unusable, UE cannot measure any CRS, and consequently cannot provide a proper or meaningful measurement report.

To provide support for additional non-IMT band on carrier aggregation a base station can indicate to UE about the potential aggregated non-IMT band. Basing a non-IMT band accessible with CR capabilities, timely configuration by base station to UE would be desired. The current integrated scheme causes long configuration delays, and the separate activate/deactivate step causes a problem in that the UE remains in RRM measurement state even on a deactivated secondary cell and thus reports measurement results via a primary cell.

Figure 5:
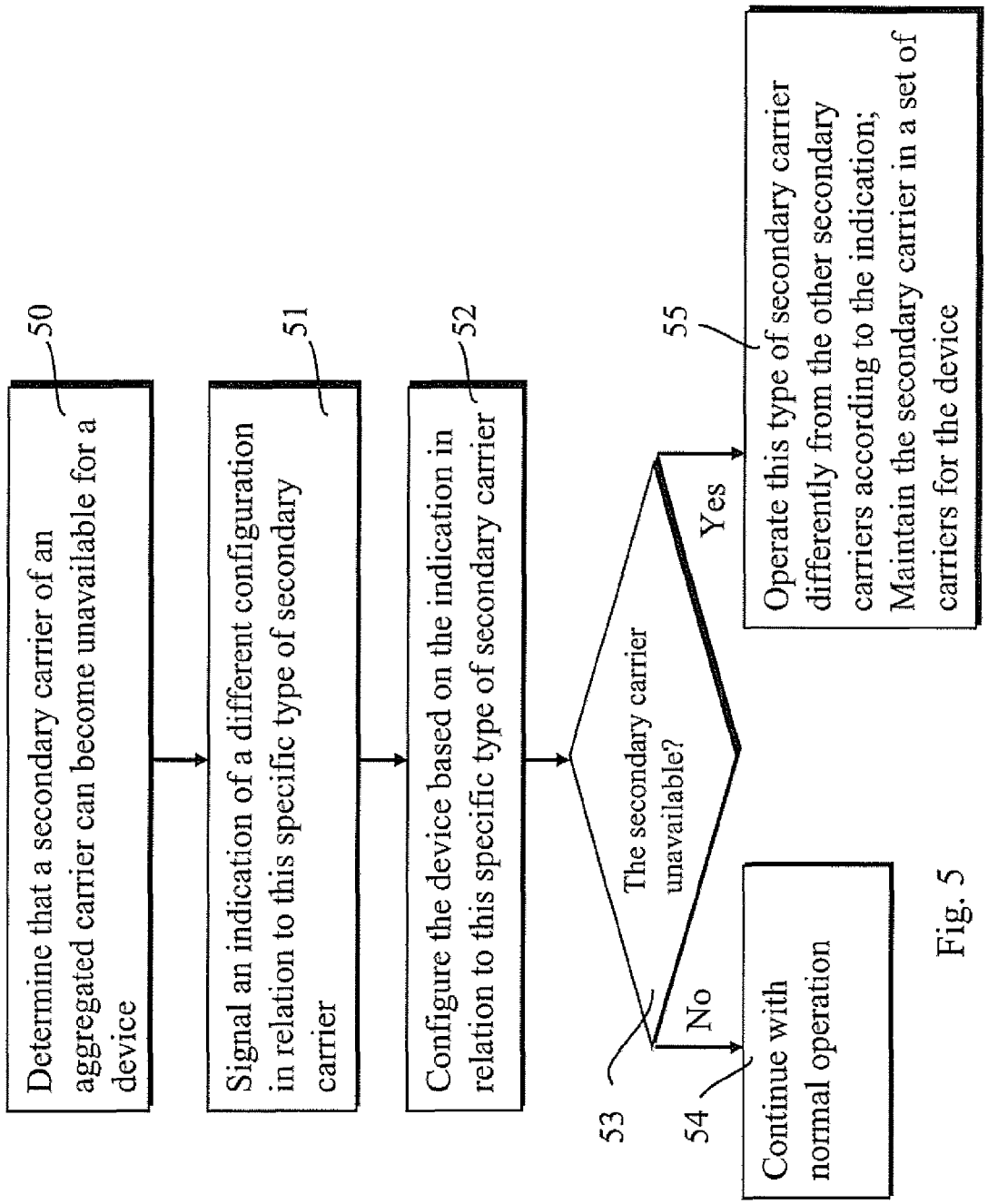
FIG. 5 is a flowchart in accordance with an embodiment.

In accordance with an embodiment shown by the flowchart of FIG. 5 an indication of a type of a secondary cell is signaled at step 51 from a base station when a secondary cell is configured to a communication device. This can be provided after determining a set of carriers available for the device, and determining at 50 that at least one of the secondary carriers of a specific type and provided by a secondary cell may become unavailable. For example, a cognitive radio (CR) relevant type secondary cell indication can be sent at 51. The indication provides instructions in relation to a secondary cell that the behavior of the communication can be different from a 'normal' secondary cell. Based on this indication the communication device can be configured differently at 52 in relation to the secondary carrier, and more particularly such that it can operate in different modes depending on the state of the secondary carrier. For example, depending on whether the secondary cell becomes unusable and/or is deactivated at 53, a 'normal' or 'different' carrier aggregation operation may follow. In accordance with a more particular example, a different operation than what would be provided at 54 for a SCell on the basis of currently specified operation in release 10 of the 3GPP specifications can be provided at 55. At the same time, the base station can maintain the secondary carrier and/or secondary cell in the set of carriers available for the communication device.

In accordance with a possibility the communication device does not perform measurements at 55 during a certain period. For example, a 3GPP user equipment (UE) does not perform measurements for the duration of deactivation of a SCell. In here it is noted that in accordance with the current 3GPP release 10 'normal' behavior radio resource measurements (RRM) would always be performed. The user equipment does not report measurement result of the SCell to the eNB during the period either. In the current 3GPP release 10 'normal' behavior measurement results of all serving cells are reported periodically or in response to a trigger. After duration of the certain period, when eNB triggers use of the SCell e.g. by an activation command, the user equipment may need to obtain downlink (DL) synchronization to the SCell similar to when it is newly configured. The current 3GPP release 10 'normal' behavior is that the user equipment shall maintain DL synchronization to all serving cells as it needs to perform RRM measurements.

In accordance with an embodiment an additional set of carriers, or a list of carriers, is provided at a base station for non-IMT band candidate carriers that can be potentially used for access. This can be provided by means of cognitive radio capability of the base station on these non-IMT bands to determine the usability thereof for IMT communications The list can be a "stand-on" list that is configured for a user equipment but needs to be activated or deactivated, depending the band usability. The bands in this list may be only bands that have ever been used or planned to be used when usable. This condition can be ensured based on an appropriate criteria. The bands may be such that they are not used for primary cell selection, but could be indicated for secondary cell selection. For a certain period when the carrier is used for incumbent or other service than an IMT carrier, the eNB does not transmit at all. For example, the base station can refrain from transmitting signals such as Primary Synchronization Signal (PSS), Secondary Synchronization Signal (SSS) and Common Reference Signal (CRS) and so on.

A new type of "stand-on" secondary cell type indication can be defined. The indication can be such that in response thereto a user equipment will not perform any measurement on the relevant band. This may occur, for example, when a carrier by a secondary cell is de-activated. When activated, user equipment may need to obtain DL synchronization of this secondary cell. If a cell is already selected as a secondary cell, and after a period of operation this band becomes not usable again, the base station will keep this band, or relevant cell, in secondary cell list for the user equipment. However, the base station shall not provide any scheduling on that band. Instead, the secondary cell is de-activated. Should the band become usable again, it will take less time for the user equipment to reactivate the secondary cell.

Referring again to the carrier aggregation example of FIG. 4, a problem may occur in supporting cognitive radio on F3 carrier where there are time periods when the carrier is not available and time period than the carrier is available. For instance, assuming F3 is on a base station's candidate list of carriers which contain all potential usable carriers with CR capability. When informed F3 usability, the base station can prepare operation on F3 (e.g. RF ready). The base station still needs to configure F3 relevant cell to specific user equipments, including a procedure where F3 relevant cell is selected as secondary cell based on a measurement report on F3. This can be based on radio resource control (RRC) signalling. Typically, if normal 3GPP procedures were to be followed, this would take 100 ms-200 ms. Configuration by the base station of the secondary cell as a cell used by user equipment is then needed. This is typically provided also by means of RRC signalling, taking another 100 ms-200 ms. The base station then activates the user equipment for this secondary cell. This can be provided by means of medium access controller (MAC) signalling. In current 3GPP operation this typically takes 8 ms. When F3 carrier become unusable a release procedure for these specific user equipments is needed. F3 carrier relevant cell can be deactivated for this user equipment by MAC signalling, taking 8 ms. F3 carrier relevant cell can be removed from the secondary cell list by RRC signalling, taking 100 ms-200 ms. F3 carrier removal from measurement objects, by means of RRC signalling, can take another 100 ms-200 ms. The total length of the configuration procedure in accordance with the normal procedure may thus become relatively long.

A handover interruption should also be minimized as much as possible to ensure an appropriate QoS, to avoid degrading services and/or to keep connection on the handover between different available carriers. In accordance with an embodiment the duration of configuration procedure (such as indication to user equipment, directions for user equipment for measurements, active/reactive commands, etc.) may be less than 100 ms for bands for use in carrier aggregation.

Figure 6:
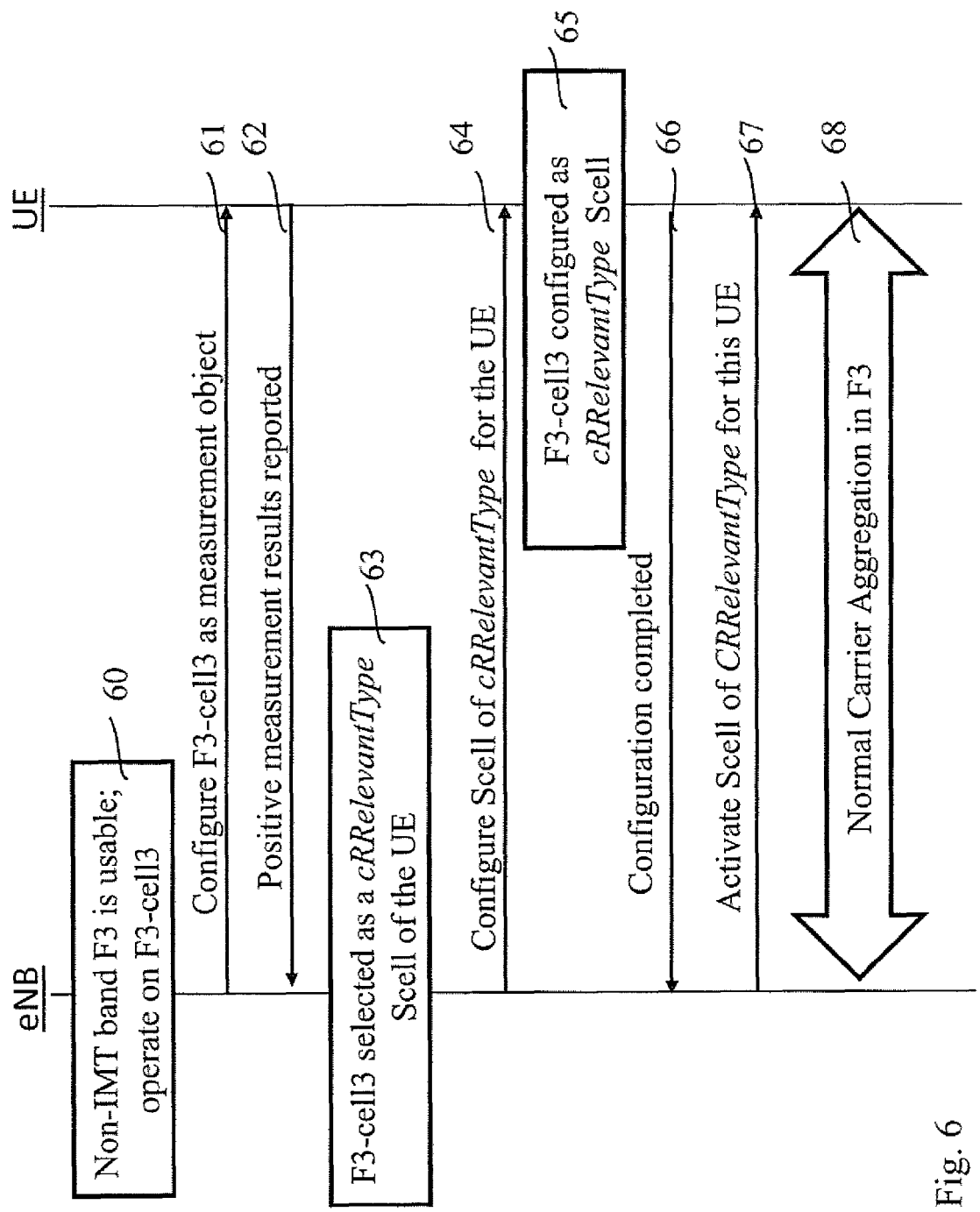
FIGS. 6 to 8 show signalling flow charts according to certain embodiments.
Figure 7:
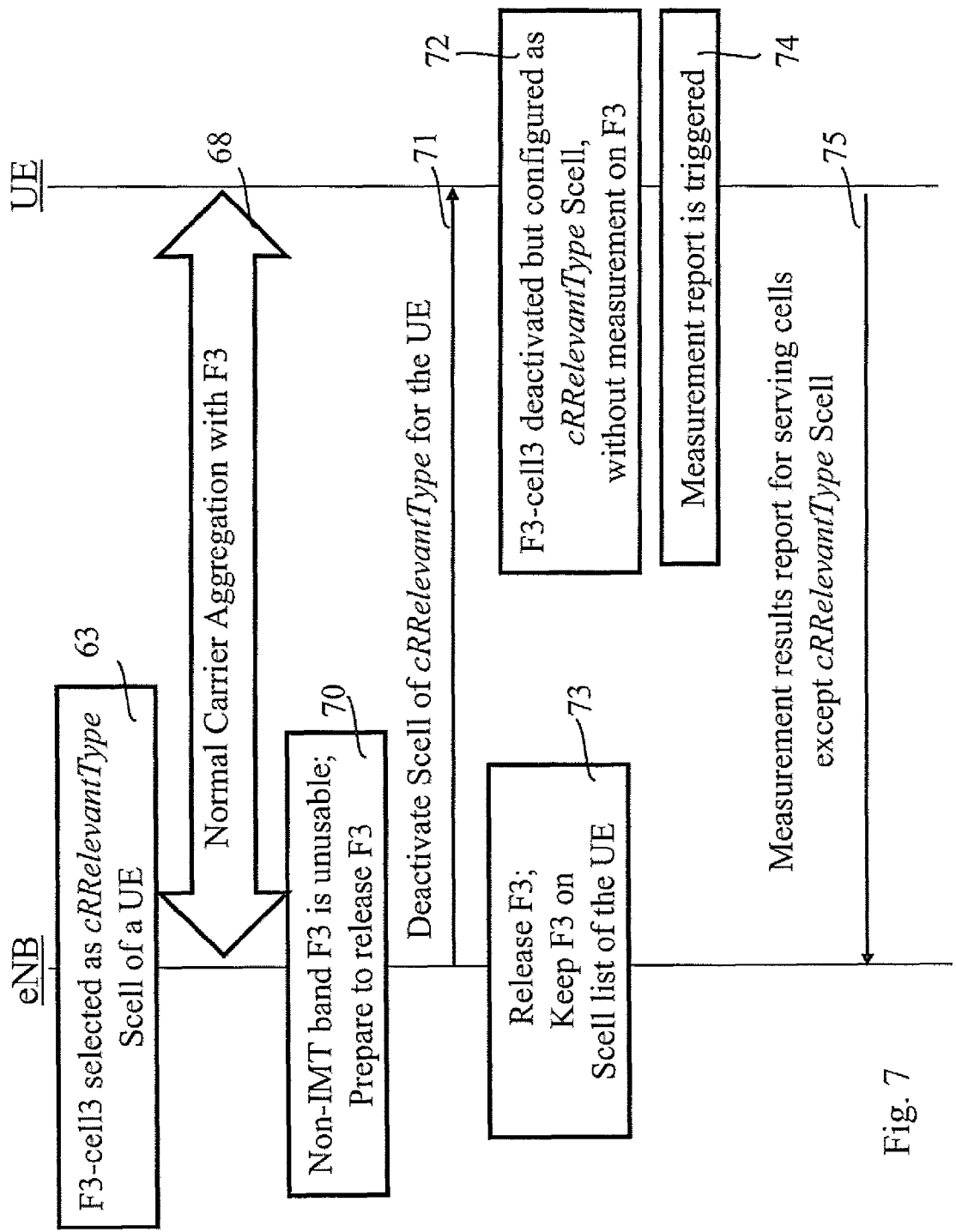
Figure 8:
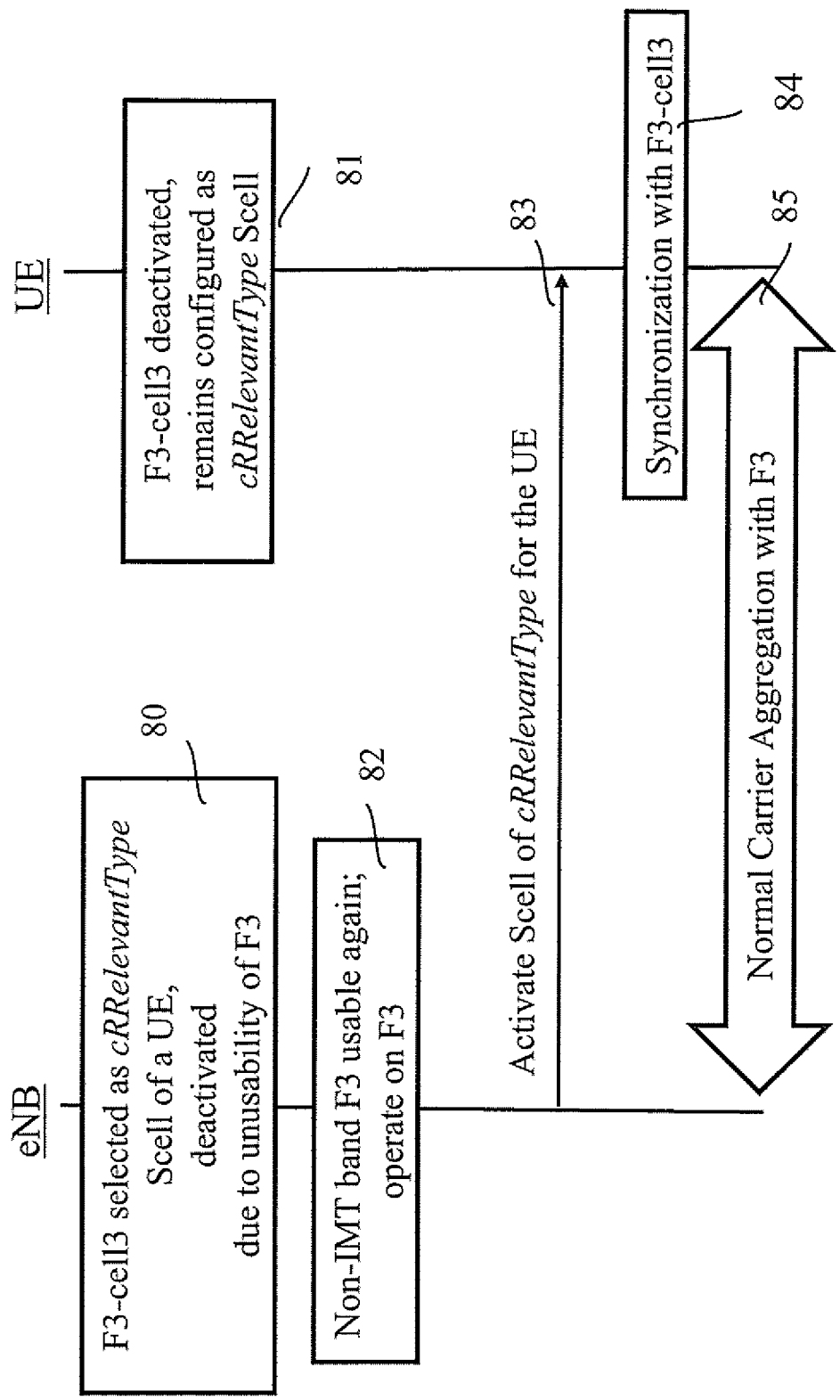

A possible signalling flow enabling shortening of the time required for these operations is shown in the signalling flowcharts of FIGS. 6 to 8.

FIG. 6 shows an example of initial configuration of a user equipment. A base station, or eNB in this example, determines at 60 that a non-IMT band F3 is usable. Operation on the F3 carrier on cell 3 is then planned accordingly. The eNB signals at 61 configuration instructions to the user equipment UE so as to configure F3-cell 3 as a measurement object. A measurement is performed by the user equipment UE, and a positive measurement report is sent back at 62 to the eNB. The cell is selected at 63 as a cognitive radio relevant cell type secondary cell for the user equipment UE. The eNB signals at 64 configuration instructions to the user equipment UE to configure it for the selected secondary cell type. The user equipment UE then configures itself at 65 accordingly in relation to this cell. Upon completing its configuration the user equipment UE signals at 66, for example by means of RRC signalling, that the configuration has been completed. The eNB can then activate at 67 the secondary cell for the user equipment UE. Since the secondary carrier is useable, the carrier aggregation is processed at 68 in a normal manner for the user equipment UE.

FIG. 7 shows signalling in the case of deactivation of the secondary component carrier F3. The channel aggregation is operated at 68 in the normal manner for the user equipment UE. At 70 it is determined that the state of F3 carrier changes, and more particularly that is becomes unusable, and release thereof is planned. A deactivation command is signalled at 71. Since the relevant cell was selected as a cognitive radio relevant cell type secondary cell for the user equipment UE at 63, and the user equipment UE was configured accordingly at stage 65 of FIG. 6, the cell is deactivated at 72 at the user equipment UE. However, as the user equipment is configured according to the received type indication it remains configured as a relevant secondary cell despite the change in state from active to deactivated. The configuration is such that no measurements are performed by the user equipment. At the eNB carrier F3 is released but it is kept on the set of secondary cells for the user equipment UE at 73.

A measurement report can be triggered at the user equipment at 74. The user equipment UE may then report at 75 to the eNB the results for all other serving cells apart from the deactivated cell.

FIG. 8 shows reactivation procedure for the user equipment UE. As described above, carrier F3 provided by cell 3 has been selected as a secondary carrier/cell for the user equipment. At stage 80 the cell has been deactivated in response of the carrier becoming unavailable. In response thereto the cell has also been deactivated at the user equipment at 81. Nevertheless, due to the configuration type indication it is maintained as a relevant secondary cell at the user equipment without performing measurement nor reporting measurement result.

At 83 the eNB determines that the secondary carrier has become usable again. Thus the user equipment can operate on F3 carrier again. The eNB can then signal at 83 an activation command to the user equipment. A synchronization procedure in relation to carrier F3 by cell3 can be performed at 84. Upon synchronisation carrier F3 is reactivated and normal carrier aggregation in relation to F3 carrier can follow at 85.

For deactivation and re-activation procedure, secondary cell configuration signaling can be omitted, and thus a quicker effective time may be realized.

In accordance with a particular embodiment modification of reconfiguration message 'RRCConnectionReconfiguration', as defined by 3GPP TS 36.331 release 10 version 10.0.1 section 6.2.2 may be modified. More particularly 'SCellToAddModList' of the message of this technical specification can be modified by adding a new indicator in the list for this specific secondary cell type. As example of this is shown below (the added indication is emphasised):

```
SCellToAddMod-r10 ::=      SEQUENCE {
    sCellIndex-r10             SCellIndex-r10,
    cellIdentification         SEQUENCE {
        physCellId-r10             PhysCellId,
        dl-CarrierFreq             ARFCN-ValueEUTRA
    }                          OPTIONAL,    -- Cond SCellAdd
    radioResourceConfigCommon-r10
    RadioResourceConfigCommonSCell-r10
        OPTIONAL,              -- Cond SCellAdd2
    radioResourceConfigDedicated-r1
    RadioResourceConfigDedicatedSCell-
                               r10 OPTIONAL, -- Cond
SCellAdd2
    ...
    [[cRRelevantType-r11       ENUMERATED    {true}
OPTIONAL,    -- Need ON
    ]]
}
```

It is noted that the name "cRRelevantType" is used herein only an example of the configuration type indication, and it is clear that any other name may be used for the indication. For example, it may be called "noMeasurementType" and so on.

An advantage of the embodiment can be that the modification required on signaling to make the procedure quicker are not necessarily extensive. The effective time required, typically 8 ms, is believed to be enough for use of variant non-IMT bands.

When user equipment receives a message such as the SCellToAddMod-r10 above with SCellToAddMod-r10 with the indication, it will not perform any measurements on this band and will not report the measurement results when this SCell is to be de-activated. When receiving activation command, the user equipment may need to obtain DL synchronization to the SCell similar to when it is newly configured.

As there will be no measurement report during the deactivated period, a base station may request for information regarding the channel quality upon blind activation, for example a Channel Quality Indicator (CQI) or another report of the quality of a wireless communication channel. If the channel quality is not suitable anymore, the base station can remove this secondary cell for the UE which is already supported currently.

It is noted that although the above describes examples for carrier aggregation extension from the current 3GPP release 10 scheme to one supporting utilization of additional non-IMT-band (e.g. C-band, TV white space band, ISM band) by a LTE-A base station with cognitive radio capability. This is not the only possible use scenario. A special type of secondary cell indicator in e.g. RRC Connection Reconfiguration signalling indicative of no measurement state on deactivation period can also be applied otherwise, for example to intra/inter IMT-bands carrier aggregation for other reasons. The indication may be used to reduce unnecessary measurements on a deactivated secondary cell and power consumption. The procedure would be similar to the procedure as for indication of the possibility of using cognitive radio. If considering a handover as a condition of releasing a band and switching to another band, for a service with a certain quality of service requirement, the handover delay (at least including the release procedure and add-new/activate carrier procedure) may be minimized.

In accordance with a possibility non-IMT technology networks may also utilize the F3 carrier of Figure for providing an incumbent service. The period of usage can make the F3 carrier unusable for the INT system. The IMT base station needs to be aware of the incumbent service's occupation of the carrier by cognitive capability, e.g. based on sensing or a database, and to ensure release this carrier to avoid interference to the incumbent service. After detecting that the carrier is available after release of the incumbent service, the IMT base station may determine the usability of the carrier and prepare to utilize it. The IMT base station here may be macro cell, micro cell or femtocell base-station, a planned relay node or even by another user equipment which has been appointed by a macro area to act as a local device-to-device (D2D) relay. A node for providing the non-IMT carrier may be provided by any node enabling a wireless device to access a communication network. Thus, in addition to the base station 12 of an IMT system, access may also be provided by means of a non-IMT cell. This is denoted by station 11 in FIG. 1. A local wireless access point can be provided for example by a station of an ISM system, or a TV broadcasting transmission station, etc. The required data processing apparatus and functions of a base station apparatus, a device in a group and any other appropriate node or element may be provided by means of one or more data processors. The described functions at each end may be provided by separate processors or by an integrated processor. The data processors may be of any type suitable to the local technical environment, and may include one or more of general purpose computers, special purpose computers, microprocessors, digital signal processors (DSPs), application specific integrated circuits (ASIC), gate level circuits and processors based on multi core processor architecture, as non limiting examples. The data processing may be distributed across several data processing modules. A data processor may be provided by means of, for example, at least one chip. Appropriate memory capacity can also be provided in the relevant devices. The memory or memories may be of any type suitable to the local technical environment and may be implemented using any suitable data storage technology, such as semiconductor based memory devices, magnetic memory devices and systems, optical memory devices and systems, fixed memory and removable memory.

An appropriately adapted computer program code product or products may be used for implementing the embodiments, when loaded or otherwise provided on an appropriate data processing apparatus, for example for causing determinations of availability and usability of carriers and switching between different modes of operation, selection and allocation of appropriate carriers and communications of information between the various nodes. The program code product for providing the operation may be stored on, provided and embodied by means of an appropriate carrier medium. An appropriate computer program can be embodied on a computer readable record medium. A possibility is to download the program code product via a data network. In general, the various embodiments may be implemented in hardware or special purpose circuits, software, logic or any combination thereof. Embodiments of the inventions may thus be practiced in various components such as integrated circuit modules. The design of integrated circuits is by and large a highly automated process. Complex and powerful software tools are available for converting a logic level design into a semiconductor circuit design ready to be etched and formed on a semiconductor substrate.

It is noted that whilst embodiments have been described in relation to certain architectures, similar principles can be applied to other communication systems where carrier aggregation is provided. For example, this may be the case in application where no fixed access nodes are provided but a communication system is provided by means of a plurality of user equipment, for example in adhoc networks. Also, the above principles can also be used in networks where relay nodes are employed for relaying transmissions. Therefore, although certain embodiments were described above by way of example with reference to certain exemplifying architectures for wireless networks, technologies and standards, embodiments may be applied to any other suitable forms of communication systems than those illustrated and described herein. It is also noted that different combinations of different embodiments are possible. It is also noted herein that while the above describes exemplifying embodiments of the invention, there are several variations and modifications which may be made to the disclosed solution without departing from the spirit and scope of the present invention.

The invention claimed is:

1. A method comprising
   determining a set of carriers available for use in carrier aggregation in a wireless communication system, wherein the set of carriers comprises at least one International Mobile Telecommunications (IMT) carrier and at least one non-IMT carrier;
   determining when the at least one non-IMT carrier of the set is usable for IMT communications and when it is unusable for IMT communications;
   sending to a communication device an indication of a configuration type of the at least one non-IMT carrier and an indication of deactivation corresponding to a period when the at least one non-IMT carrier is unusable for IMT communication, the configuration type being indicative of a different behavior during the period wherein the different behavior comprises refraining from reporting measurement results corresponding to the at least one non-IMT carrier; and
   maintaining the at least one non-IMT carrier in the set of carriers during the period and
   ceasing scheduling of resources on the at least one non-IMT carrier during the period.

2. The method of claim 1, wherein the period comprises a period of unavailability of the at least one non-IMT carrier for the communication device.

3. The method of claim 1, wherein the period comprises duration of an activation or deactivation procedure of the at least one non-IMT carrier.

4. The method of claim 1, wherein the configuration type is indicated in relation to at least one of: a secondary cell and a non-IMT band.

5. The method of claim 1, further comprising providing the carrier aggregation by means of at least one carrier provided by a primary cell and at least one non-IMT carrier provided by a secondary cell, wherein the at least one non-IMT carrier provided by the secondary cell varies more than the at least one carrier provided by the primary cell.

6. The method of claim 1, further comprising use of the at least one non-IMT carrier based on cognitive radio.

7. The method of claim 1, wherein the communication device refrains from measurement operations on the at least one non-IMT carrier during said period, wherein the measurement operation comprises at least one of measuring and reporting measurement results.

8. The method of claim 1, further comprising ceasing of scheduling of resources on the at least one non-IMT carrier during said period.

9. The method of claim 1, wherein determining of the at least one non-IMT carrier comprises determining usability of the at least one non-IMT carrier.

10. A method comprising:
receiving an indication of a configuration type of at least one non-IMT carrier of a set of carriers available for use in carrier aggregation in a wireless communication system, and an indication of deactivation corresponding to a period when the at least one non-IMT carrier is unusable for IMT communications, the configuration type being indicative of a different behavior during the period, wherein the set of carriers comprises at least one International Mobile Telecommunications (IMT) carrier and the at least one non-IMT carrier and wherein the different behavior comprises refraining from reporting measurement results corresponding to the at least one non-IMT carrier; and
operating a communication device in relation to the at least one non-IMT carrier according to the different behavior during the period.

11. The method of claim 10, further comprising determining a change in the availability state of the at least one non-IMT carrier upon receiving instructions for activation or deactivation of the at least one non-IMT carrier.

12. The method of claim 10, further comprising
receiving a deactivation command, and
upon reception of the deactivation command, switching to operation in accordance with the indication of the configuration type.

13. The method of claim 10, further comprising receiving an activation command, and upon reception of the activation command, performing synchronization with a secondary cell providing the at least one non-IMT carrier.

14. An apparatus comprising
at least one processor, and at least one memory including computer program code, wherein the at least one memory and the computer program code are configured, with the at least one processor, to
determine a set of carriers available for use in carrier aggregation in a wireless communication system, wherein the set of carriers comprises at least one IMT carrier and at least one non-IMT carrier;
determine when the at least one non-IMT carrier of the set is usable for IMT communications and when it is unusable for IMT communications;
cause sending to a communication device an indication of a configuration type of the at least one non-IMT carrier and an indication of deactivation corresponding to a period when the at least one non-IMT carrier is unusable for IMT communication, the configuration type being indicative of a different behavior during the period wherein the different behavior comprises refraining from reporting measurement results corresponding to the at least one non-IMT carrier; and
maintain the at least one non-IMT carrier in the set of carriers during the period and cease scheduling of resources on the at least one non-IMT carrier during the period.

15. Art apparatus comprising
at least one processor, and at least one memory including computer program code, wherein the at least one memory and the computer program code are configured, with the at least one processor, to
receive an indication of a configuration type of at least one non-IMT carrier of a set of carriers available for use in carrier aggregation in a wireless communication system, and an indication of deactivation corresponding to a period when the at least one non-IMT carrier is unusable for IMT communications, the configuration type being indicative of a different behavior during the period, wherein the set of carriers comprises at least one International Mobile Telecommunications (IMT) carrier and the at least one non-IMT carrier and wherein the different behavior comprises refraining from reporting measurement results corresponding to the at least one non-IMT carrier; and
cause operation of a communication device in relation to the at least one non-IMT carrier according to the different behavior during the period.

* * * * *